Nov. 25, 1930.  E. A. HAZEN  1,782,613
FISHING TOOL
Filed May 8, 1926  2 Sheets-Sheet 1
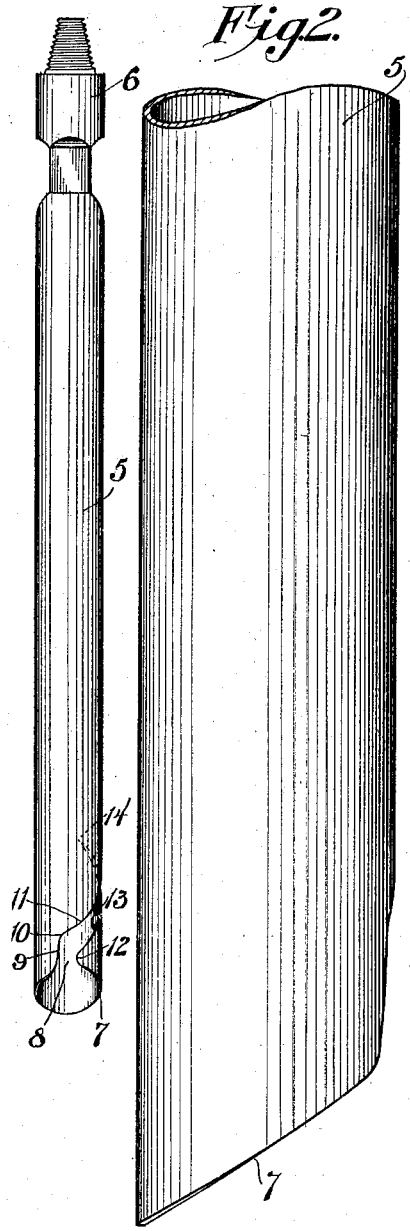
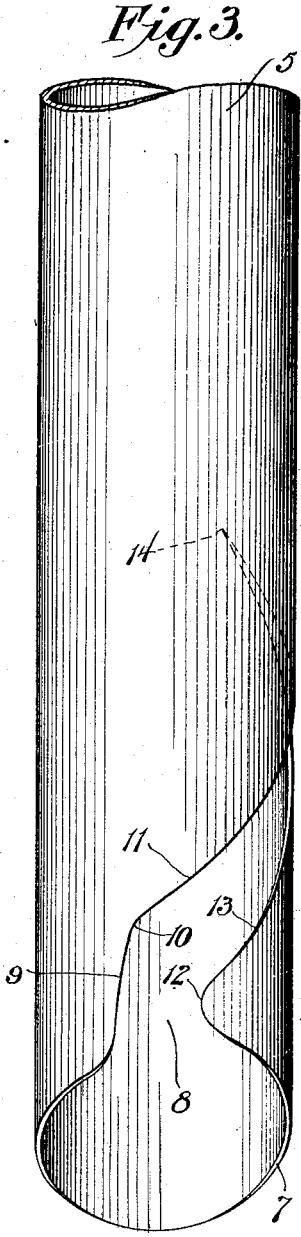
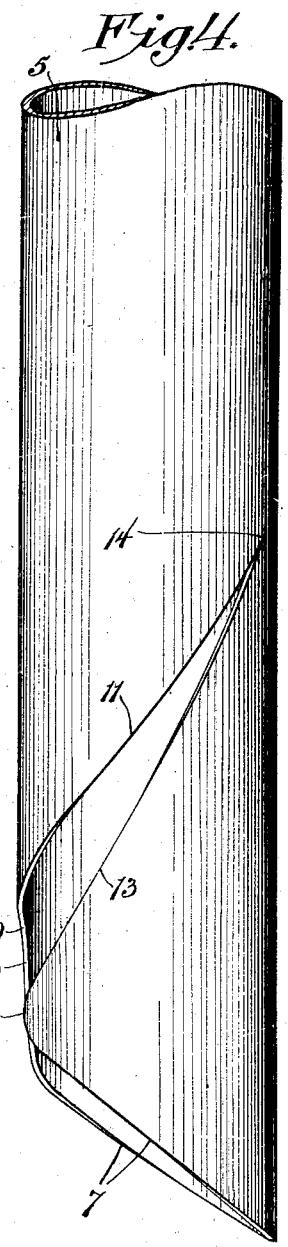
WITNESSES
C. L. McDonald
E. N. Lovewell
INVENTOR
Earl A. Hazen
BY
ATTORNEY Nov. 25, 1930.  E. A. HAZEN  1,782,613
FISHING TOOL
Filed May 8, 1926   2 Sheets-Sheet 2
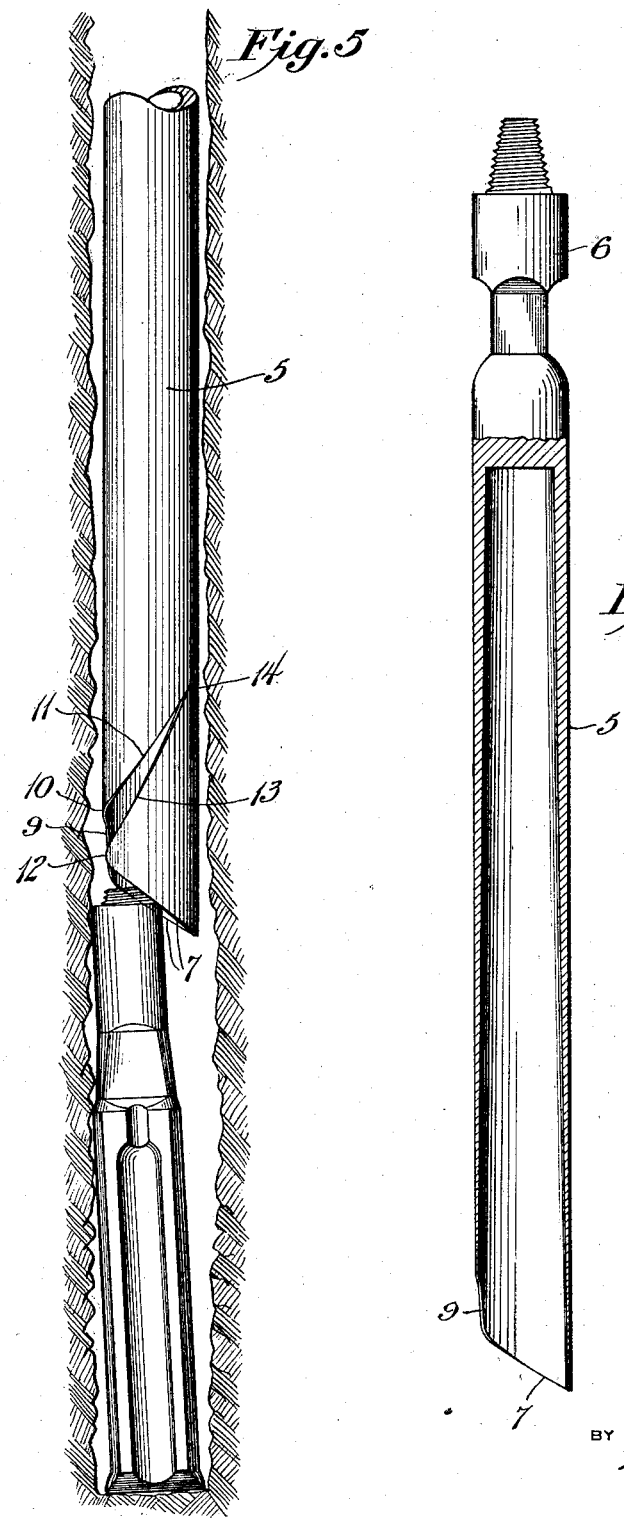
INVENTOR
Earl Hazen
BY
Siggers & Adams
ATTORNEYS Patented Nov. 25, 1930

1,782,613

UNITED STATES PATENT OFFICE

EARL A. HAZEN, OF JOPLIN, MISSOURI, ASSIGNOR TO KEYSTONE DRILLER COMPANY, OF BEAVER FALLS, PENNSYLVANIA, A CORPORATION OF PENNSYLVANIA

FISHING TOOL

Application filed May 8, 1926. Serial No. 107,722.

This invention relates to a fishing tool, especially adapted to be used in drilled wells for recovering drill bits and similar tools which have been lost therein. It has been designed with particular reference to its use with churn drill outfits, but may also at times be used with those of the rotary type.

The object of the invention is to provide a fishing tool adapted to envelop or slide over and grip a bit or other tool which has broken off at the pin, or has become loose and lies over against the wall of the hole, and has possibly become sanded in.

A fishing tool constructed according to my invention combines the advantages of a horn socket and a wall hook, and comprises improvements on both of these tools as they are commonly constructed.

The essential characteristics of the invention and the advantages resulting therefrom will be more specifically explained in the following detailed description, which is to be taken in connection with the accompanying drawing illustrating the same in its preferred form.

In the drawing:

Figure 1 is a side elevation of the complete fishing tool.

Figure 2 is an enlarged side elevation of the lower portion of the tool, as viewed from the left of Figure 1.

Figure 3 is an enlarged view of the lower portion of Figure 1.

Figure 4 is a view taken from the opposite side to that shown in Figure 2.

Figure 5 is a view of the portion of the tool shown in Fig. 4 about to engage a broken drill bit to be recovered.

Figure 6 is a view of the tool shown in Fig. 1 with a portion cut away to show the tapered construction of the interior of the tool.

A tool, which embodies my invention, is shown in the drawings, and has a tubular portion 5 extending for the greater portion of its length, and of substantially the same diameter as the hole in which it is to be used. Connected to the upper end of the tubular portion is a head 6, formed with a tapered threaded pin adapted to be secured to a swivel socket, or to the lower end of a rotary drill pipe. The tubular portion 5 terminates at its lower end in an inclined edge 7, having a slot 8 at or near its uppermost portion. This slot extends directly upwardly for a short distance, and then helically. One side of the slot is formed by the edge 9, which extends longitudinally of the tool and almost parallel to its axis to the point 10, where it merges into the helical edge portion 11. The other edge 13 of the slot provides a nose 12, which is similar in function to the so-called wall hook now in use, and said edge 13 extends thence helically upwardly. The helical edge portion 13 has a sharper pitch than the edge portion 11, so that the two helical edges converge upwardly until they meet in a point 14, from twenty-four to thirty inches from the wall hook 12 on the opposite side of the tool from their starting point.

The purpose of the described shaping of the lower end of the tool is to cause the tool to turn on its axis, by its own weight, as its lower end engages the bit until the latter enters the gap 8, and the wall hook 12 engages underneath the bit and draws it into the tube. That is, the wall hook 12 will drop past the collar of the bit as the point 10 engages the collar. Upon jarring from this position, the tool will be rotated by the helical edge 11 riding on the collar of the bit, causing the hook 12 to slide behind the collar. Then, by continued jarring, if necessary, the edge 13 will work behind the bit and gradually pull it away from the wall of the hole until it is drawn entirely within the tube 5. The lower edge 7 is cut at an inclination for the double purpose of guiding the bit, or other lost tool, to the gap 8, and eliminating the chance of the edge of the tubing 5 from hanging up on the upper shank of the bit. The tube 5, itself, is made in the form of a friction or horn socket, or riveted to a slip socket, to remove the lost tool from the well after it has been engaged. Thus a single tool is provided which combines the functions of a wall hook and a horn socket.

While I have shown and described specifically the shape of the tool as it is at present constructed, it is apparent that the same may be modified to a considerable extent without any material departure from the salient features of the invention as claimed.

What is claimed is:

1. A fishing tool having a tubular horn socket portion terminating in an inclined edge, and formed with a slot in its wall extending upwardly from the region of the highest part of said edge, and having opposed helical sides; the slot having smooth and unbroken walls to serve as a guide.

2. A fishing tool having a tubular horn socket portion terminating in an inclined edge, and formed with a slot in its wall extending upwardly from the region of the highest part of said edge, and having opposed helical sides which gradually converge upwardly until they meet; the slot having smooth and unbroken walls to serve as a guide.

3. A fishing tool having a tubular lower portion terminating in an inclined edge, and formed with a slot in its wall extending from the region of the highest part of said edge, first directly upwardly and then helically, thus forming a wall hook below the base of the helical portion; said tool also having an interior surface formed to provide a horn socket.

4. A fishing tool having a tubular lower portion terminating in an inclined edge, and formed with a slot in its wall extending from the region of the highest part of said edge, first directly upwardly and then helically, thus forming a wall hook below the base of the helical portion, the flanking edges of the helical portion of the slot gradually converging upwardly until they meet; said tool also having an interior surface formed to provide a horn socket.

5. A fishing tool having a tubular lower portion, terminating in an inclined edge and formed with a slot in its wall extending upwardly from the region of the highest part of said edge, said slot having opposed helical edges which meet at a point considerably above, and on the opposite side of the tube from their starting points; said tool also having an interior surface formed to provide a horn socket.

6. A fishing tool having a tubular lower portion, terminating in an inclined edge and formed with a slot in its wall extending from the region of the highest part of said edge, first directly upwardly and then helically, thus forming a wall hook below the base of the helical portion, said helical portion of the slot having opposed edges which meet at a point considerably above and on the opposite side of the tube from the base of the helical portion; said tool also having an interior surface formed to provide a horn socket.

7. A fishing tool combining in a single implement a wall hook and a horn socket; the horn socket portion thereof having nonmovable surfaces for gripping the tool.

In testimony that I claim the foregoing as my own, I have hereto affixed my signature.

EARL A. HAZEN.